United States Patent
Righettini et al.

(10) Patent No.: US 7,019,075 B2
(45) Date of Patent: Mar. 28, 2006

(54) ACRYLIC STRUCTURAL ADHESIVE HAVING IMPROVED T-PEEL STRENGTH

(75) Inventors: Robin F. Righettini, Apex, NC (US); Jeffrey A. Hatcher, Holly Springs, NC (US)

(73) Assignee: Lord Corporation, Cary, NC (US)

(*) Notice: Subject to any disclaimer, the term of this patent is extended or adjusted under 35 U.S.C. 154(b) by 170 days.

(21) Appl. No.: 10/662,010

(22) Filed: Sep. 11, 2003

(65) Prior Publication Data

US 2004/0059058 A1   Mar. 25, 2004

Related U.S. Application Data

(62) Division of application No. 10/147,648, filed on May 16, 2002, now Pat. No. 6,660,805.

(51) Int. Cl.
*C08L 51/04* (2006.01)
*C08L 53/02* (2006.01)

(52) U.S. Cl. ............ 525/64; 524/548; 525/65; 525/66; 525/92 H; 525/117; 525/119; 525/122; 525/245; 525/263

(58) Field of Classification Search .......... 525/65, 525/92 H, 117, 119, 122, 69, 99, 245, 263; 252/182.18; 524/548
See application file for complete search history.

(56) References Cited

U.S. PATENT DOCUMENTS

| | | | |
|---|---|---|---|
| 3,925,330 A * | 12/1975 | McCarthy | 526/273 |
| 4,243,500 A | 1/1981 | Glennon | 204/159.12 |
| 4,451,615 A * | 5/1984 | Charnock | 525/98 |
| 4,515,917 A * | 5/1985 | Yamamoto et al. | 524/178 |
| 4,569,968 A | 2/1986 | Uffner et al. | 525/54.5 |
| 4,591,618 A | 5/1986 | Naito et al. | 525/279 |
| 4,769,419 A | 9/1988 | Dawdy | 525/111 |
| 4,910,259 A * | 3/1990 | Kindt-Larsen et al. | 525/259 |
| 5,106,928 A * | 4/1992 | Skoultchi et al. | 526/196 |
| 5,500,293 A | 3/1996 | Lau et al. | 428/355 |
| 5,632,413 A | 5/1997 | Herring, Jr. et al. | 222/1 |
| 5,641,834 A | 6/1997 | Abbey et al. | 525/77 |
| 5,710,235 A | 1/1998 | Abbey et al. | 528/288 |
| 5,728,759 A | 3/1998 | Pike | 524/270 |
| 5,783,298 A | 7/1998 | Herring, Jr. et al. | 428/323 |
| 5,932,638 A * | 8/1999 | Righettini et al. | 523/503 |
| 6,074,506 A | 6/2000 | Herring, Jr. et al. | 156/196 |
| 6,180,199 B1 | 1/2001 | Herring, Jr. et al. | 428/44 |
| 6,225,408 B1 | 5/2001 | Huang et al. | 525/88 |
| 6,730,411 B1 * | 5/2004 | Doe et al. | 428/500 |

FOREIGN PATENT DOCUMENTS

| | | | |
|---|---|---|---|
| EP | 220555 A2 * | 5/1987 | |
| EP | 0487058 | 5/1992 | |
| JP | 11001663 A * | 1/1999 | |
| JP | 2001261723 A * | 9/2001 | |
| WO | WO 97/39074 | 10/1997 | |
| WO | WO 99/64529 | 12/1999 | |

* cited by examiner

*Primary Examiner*—Robert Sellers
(74) *Attorney, Agent, or Firm*—Todd W. Galinski

(57) ABSTRACT

A two-part acrylic structural adhesive comprises a first package containing from about 10 to about 90 percent by weight of at least one ethylenic unsaturated methacrylic ester selected from the group consisting of 1) an alkyl mono-, di- or tetra-substituted cyclohexyl methacrylate, wherein the substitutions occur in either the 3, 4, and/or 5 ring positions, and 2) a linear or branched $C_4$–$C_{10}$ alkyl methacrylate; from about 10 to about 80 percent by weight of a toughener, and an adhesion promoter; and a second package containing a bonding activator, and, optionally, an epoxy resin.

3 Claims, No Drawings

ACRYLIC STRUCTURAL ADHESIVE HAVING IMPROVED T-PEEL STRENGTH

CROSS REFERENCE

This application is a divisional application of U.S. Ser. No. 10/147,648 filed May 16, 2002, which is now U.S. Pat. No. 6,660,805, issued Dec. 9, 2003, which is hereby fully incorporated by reference.

BACKGROUND

Acrylic structural adhesives are extensively used for providing structural strength-imparting bonds to joined metal and/or polymer materials. Acrylic structural adhesives are useful for bonding of metal parts in place of welding or mechanical fastening techniques. The structural requirements include high bond strength and good failure mode. A typical method to measure bond strength is the T-peel test. One prevalent use for acrylic structural adhesives is in forming hem flanges in automotive body panels and doors. Exemplary conventional acrylic structural adhesives and methods for using acrylic structural adhesives are disclosed in the following U.S. Patents:

U.S. Pat. No. 6,180,199 entitled Beaded Adhesive And Hem Flanged Part Made Therefrom;
U.S. Pat. No. 6,074,506 entitled Method Of Bonding Using Non-Compressible Beads;
U.S. Pat. No. 5,932,638 entitled Free Radical Polymerizable Compositions Including Para-Halogenated Aniline Derivatives;
U.S. Pat. No. 5,783,298 entitled Adhesive Mixture With Non-Compressible Beads Therein;
U.S. Pat. No. 5,710,235 entitled Olefinic And Urethane-Terminated Ester Polyalkadiene;
U.S. Pat. No. 5,641,834 entitled Modified Polyalkadiene-Containing Compositions; and
U.S. Pat. No. 5,632,413 entitled Adhesive Bonding Apparatus And Method Using Non-Compressible Beads.

Conventional acrylic structural adhesives typically comprise a mixture of one or more olefinic reactive monomers such as methyl methacrylate and methacrylic acid, toughener(s) and redox initiator system. The toughener(s), which may or may not be reactive, or polymerizable with the reactive monomers. Reactive polymers such as unsaturated polyesters, acrylourethane prepolymers may used to grafting onto or crosslink the initiated monomers during polymerization. In addition, fully formulated acrylic structural adhesives typically contain other additives for improving adhesion to substrate materials, environmental resistance, impact strength, flexibility, heat resistance, and the like. Epoxy resins impart improved heat resistance.

U.S. Pat. No. 5,932,638 discloses a structural adhesive which utilizes a redox catalyst system that includes certain para-halogenated aniline reducing agents. U.S. Pat. No. 4,769,419 ("the '419 patent"), incorporated herein by reference, discloses structural adhesive compositions for metal-metal bonding applications. The adhesives include as tougheners olefinic terminated liquid rubbers which are reacted with monoisocyanate compounds. These tougheners are urethane modified olefinic-terminated liquid elastomer produced from a carboxylic acid-terminated alkadiene or, alternatively, as isocyanate-capped methacrylate-terminated polyalkadiene produced from a carboxylic acid-terminated polyalkadiene. The '419 patent further describes acrylic adhesives with olefinic monomer, olefinic urethane reaction product of an isocyanate-functional prepolymer and a hydroxy-functional monomer, phosphorus-containing compounds, an oxidizing agent and a free radical source.

U.S. Pat. Nos. 5,641,834 and 5,710,235, both incorporated herein by reference, disclose adhesives that include as tougheners an olefinic-terminated polyalkadiene that includes carboxy ester linking groups and at least one nascent secondary hydroxyl group that is capped with a monoisocyanate. These tougheners represented by the formulae for polymer A or polymer B in claim 1 are referred to herein as "olefinic-terminated liquid elastomer produced from a hydroxyl-terminated polyalkadiene" or, alternatively, as "isocyanate-capped methacrylate-terminated polyalkadiene produced from a hydroxyl-terminated polyalkadiene". The composition also includes a free radical-polymerizable monomer such as an olefinic monomer and, optionally, a second polymeric material. In a preferred embodiment the composition is an adhesive that also includes a phosphorus-containing compound and an ambient temperature-active redox catalyst.

U.S. Pat. No. 5,728,759 ("the '759 patent") discloses non-structural waterbased pressure sensitive adhesives and methods of preparation including an adhesive entity, a tackifier resin, a plasticizer, stabilizer, curing entity and optional additives. Objects of the '759 patent include providing masking tapes that do not freeze to an automobile body or window on exposure of the tapes to relatively high temperatures while in contact with such surfaces. Elastomeric block copolymers usable in the adhesive entity include block copolymers "EUROPRENE.™. Sol T 193A" from Enichem AMERICAS.

U.S. Pat. No. 5,500,293 is directed to a non-structural adhesive composition suitable for use in an insulating tape having improved plasticizer resistance, including from about 13% to about 42% of a polyisoprene homopolymer, from about 13% to about 42% of a styrene-isoprene-styrene copolymer, and from about 25% to about 55% of an aliphatic tackifying agent. The styrene-isoprene-styrene copolymers disclosed include EUROPRENE.™.

Huang, Righettini and Dennis disclose in U.S. Pat. No. 6,225,408 as the curable adhesive portion a mixture of 10–90% by weight of at least one free radical-polymerizable monomer, optional adhesion promoter, a primary toughener with a weight average molecular weight ($M_w$) less than about 18,000 and an auxiliary toughener with a $M_w$ greater than about 18,000.

Peel strength and failure mode of the current acrylic structural adhesives leaves room for improvement. In investigating different principal methacrylic ester monomers from among the myriad methacrylates, many are disqualified due to objectionable odor or lower T-peel strength on electro-galvanized steel. A state of the art epoxy modified acrylic based upon tetrahydrofurfuryl methacrylate yields 39–41 pounds per linear inch T-Peel on electrogalvanized steel. Substitution of certain alcohols in the ester moiety of the methacrylate esterification lead to surprising improvements in T-peel strength, and these monomers providing improved T-Peel do not exhibit objectionable odor. In another aspect, it was discovered that conventional acrylic structural adhesives containing an epoxy curative in a particular mix ratio limiting the epoxy resin content exhibited significantly improved T-peel strength.

SUMMARY

In one aspect, the invention resides in an epoxy-modified two-part acrylic structural adhesive characterized by improved T-peel strength, in that the wt. percent of epoxy resin based on the weight of parts A and B of the adhesive is in a range of from 3% to 6%. These adhesives are not inhibited by oxygen. In a 2-pack dispensing system, where parts A and B are mixed in a nozzle equipped with a static mixer, the parts A and B part are combined in a mix ratio of 6:1–14:1 by volume, preferably from 8:1 to 12:1 and most preferably 9:1–11:1.

In another aspect, the invention is a 2-part acrylic structural adhesive exhibiting improved T-peel strength on galvanized steel and rapid ambient curing via radical polymerization,
(A) in a first package
   from about 10 to about 90 percent by weight of at least one methacrylate selected from the groups 1) and 2)
   1) $C_3$–$C_{10}$ alkyl monosubstituted-, $C_1$–$C_6$ alkyl disubstituted-, $C_1$–$C_4$ alkyl tri-substituted, and $C_1$–$C_4$ alkyl tetra-substituted cyclohexyl methacrylate, wherein the substituents are in either the 3, 4, and/or 5 ring position and 2) linear or branched $C_4$–$C_{10}$ branched alkyl methacrylates; and
   (2) from about 10 to about 80 percent by weight of a toughener,
   (3) adhesion promotor;
(B) in a second package, a bonding activator, and optional epoxy resin.

An exemplary preferred epoxy-modified two-part acrylic structural adhesive contains about 3 to about 6% by wt. of epoxy resin, which is contained in the B-side.

Comprises:

in the A-side
(a) 10–90, preferably 20–70, weight percent of an olefinic monomer selected from the group consisting of (meth) acrylic acid; esters, amides or nitriles of (meth)acrylic acid; maleate esters; fumerate esters; vinyl esters; conjugated dienes; itaconic acid; styrenic compounds; and vinylidene halides;
(b) 10–80, preferably 20–50, weight percent of the primary toughener;
(c) 0–15, preferably 1–10, weight percent of the auxiliary toughener;
(d) 0–20, preferably 2–10, weight percent of a phosphorus adhesion promotor compound having one or more olefinic groups,
(e) 0.05–10, preferably 0.1–6, weight percent of at least one reducing agent which is interactive with an oxidizing agent to produce free radicals which are capable of initiating and propagating free radical polymerization reactions; and in the B-Side or second package a bonding activator containing an oxidizing agent of a room temperature-active redox couple catalyst system, the oxidizing agent being reactive at room temperature with agent, and 3–6% wt. on total weight of A and B sides, of an epoxy resin.

DESCRIPTION OF THE PREFERRED EMBODIMENTS

Monomer

In the general embodiment containing a specified amount of epoxy resin, the A-side of the two part reactive acrylic structural adhesive contains 10–90% by weight of at least one free radical-polymerizable monomer in a major amount (the primary monomer). Representative monomers include esters of (meth)acrylic acid such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate (THFMA). The preferred monomer contributes rigidity in the cured polymer and are selected from methacrylic esters exhibiting a homopolymer Tg of at least 80° C., preferably 105° C. The major monomer may be combined with an ethylenic unsaturated carboxylic monomer such as methacrylic acid, acrylic acid, substituted (meth)acrylic acids such as itaconic acid. Further optional comonomers includable herein are acrylonitrile, methacrylonitrile, acrylamide and methacrylamide; styrene; substituted styrenes such as vinyl styrene, chlorostyrene, methyl styrene and n-butyl styrene; vinyl acetate; vinylidene chloride; and butadienes such as 2,3-dichloro-1,3-butadiene and 2-chloro-1,3-butadiene. Other useful monomers include maleate esters; fumarate esters; and styrenic compounds such as styrene, chlorostyrene, methylstyrene, butylstyrene and vinyl styrene. In one embodiment, a mixture of the monomers tetrahydrofurfuryl methacrylate, methacrylic acid and methyl methacrylate is useful. It is preferred to include a reactive diluent with the primary monomer. In one embodiment the reactive diluent is (meth)acryloyl substituted dibasic acid, such as hydroxyethyl methacryloyl phthalate (HEMA-phthalate).

Comonomers optionally includable with the primary monomer include OH-functional monoethylenic unsaturated monomers like 3-hydroxypropyl (meth)acrylate, 4-hydroxybutyl (meth)acrylate, 4-hydroxycyclohexyl(meth) acrylate, 1,6-hexanediol mono(meth) acrylate, neopentyl glycol mono(meth)acrylate. Preferedly from 2–10 wt % (on wt. of A-side) of a multifunctional crosslinking comonomer is included, such as trimethylohpropane di(meth) acrylate, trimethylolethane di(meth) acrylate, pentaerythritol tri (meth) acrylate, dipentaerythritol penta(meth)acrylate, and epoxy-diacrylates, such as ethoxylated Bisphenol A dimethacrylate.

In the embodiments of the 2-part adhesive exhibiting improved T-peel strength, per se, epoxy resin is optional. The preferred primary monomer contained in the A-side and is distinguished by the moiety in the ester portion, and which exhibits a homopolymer Tg of equal or above 105° C. The amount of monomer present is about 10 to about 90 percent by weight of the A-side, and is at least one methacrylate selected from the groups 1) and 2) where group 1) is $C_3$–$C_{10}$ alkyl monosubstituted cyclohexyl-, or $C_1$–$C_6$ alkyl disubstituted-cyclohexyl-, or $C_1$–$C_4$ alkyl tri-substituted-cyclohexyl-, or $C_1$–$C_4$ alkyl tetra-substituted cyclohexyl methacrylate, and group 2) includes linear or branched $C_4$–$C_{10}$ alkyl methacrylates. Some specific examples of group 1) and 2) include 3,3,5-trimethylcyclohexyl methacrylate, 4-tert-butylcyclohexyl methacrylate, 3,3,5,5-tetramethylcyclohexyl methacrylate, 3,4,5-trimethylcyclohexyl methacrylate, bornyl ($C_{10}H_{17}$) methacrylate, isobornyl methacrylate, and (isopropyl methyl) methacrylate. The substituents on the cycloaliphatic group, based on the starting alcohol transesterified with the α,β-unsaturated acid are preferredly in either the 3, 4, and/or 5 ring position. Specific examples or the preferred T-peel improving monomers include 3,3,5-trimethylcyclohexyl methacrylate, 4-tert-butylcyclohexyl methacrylate, 3,3,5,5-tetramethylcyclohexyl methacrylate, 3,4,5-trimethylcyclohexyl methacrylate, bornyl ($C_{10}H_{17}$) methacrylate, isobornyl methacrylate, and (isopropyl methyl) methacrylate.

The acrylic adhesive systems of the invention can optionally contain up to about 50, preferably not more than about 25 percent by weight based on total weight of the A-side package of at least one polymerizable olefinic non-acrylic monomer; up to about 60 preferably not more than about 30 percent by weight based on total weight of the A-side package of a polymeric material having an intrinsic viscosity from about 0.1 to about 1.3, such polymeric material being obtained from the polymerization of a styrene monomer, acrylic monomer, substituted acrylic monomer, olefinic non-acrylic monomer or mixtures thereof; up to about 5 percent by weight of an unsaturated dicarboxylic acid ester; up to about 20 percent by weight of an unsaturated carboxylic acid having one or more, preferably one, carboxylic acid group; and up to about 1 percent by weight of a waxy substance selected from the group consisting of paraffin wax, beeswax, ceresin wax and spermaceti wax.

Tougheners

Any suitable toughener can be utilized in the structural adhesives according to the inventions. The toughener examples include various solid and liquid elastomeric polymeric materials, and in particular liquid olefinic-terminated elastomers as described in U.S. Pat. Nos. 4,223,115; 4,452,944; 4,769,419; 5,641,834 and 5,710,235; and olefinic urethane reaction products of an isocyanate-functional prepolymer and a hydroxy functional monomer, as described in U.S. Pat. Nos. 4,223,115; 4,452,944; 4,467,071 and 4,769,419, the entire disclosure of each which is hereby incorporated by reference. A-B-A triblock block copolymers are useful tougheners. In one example the A block is polystyrene, alpha-methyl styrene, t-butyl styrene, or other ring alkylated styrenes as well as mixtures of some or all of the above and the B block is an elastomeric segment having a Tg of 0° C. or less, such as that derived from a conjugated diene, isobutylene or other olefin, like ethylene-propylene monomer. Commercially available block copolymer tougheners include EUROPRENE® which are available from Enichem Elastomers Americas, Inc. A preferred toughener is based on a terblock polymer of styrene-[isoprene]-styrene, 25-[50]-25, parts by weight. Other high molecular weight tougheners include, for example, block copolymers and random copolymers including but not limited to polyethylene, polypropylene, styrene-butadiene, polychloroprene, EPDM, chlorinated rubber, butyl rubber, styrene/butadiene/acrylonitrile rubber and chlorosulfonated polyethylene.

Other tougheners include the liquid olefinic-terminated elastomers, wherein the elastomeric moiety is based on homopolymers of butadiene, copolymers of butadiene and at least one monomer copolymerizable therewith, for example, styrene, acrylonitrile, methacrylonitrile (e.g. poly(butadiene-(meth)acrylonitrile or poly(butadiene-(meth)acrylonitrile-styrene) and mixtures thereof; as well as modified elastomeric polymeric materials, such as butadiene homopolymers and copolymers modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers.

Inclusive as tougheners are the olefinic-terminated polyalkadienes having carboxy ester linking groups and at least one nascent secondary hydroxyl group, such as disclosed in U.S. Pat. No. 5,587,433, incorporated herein by reference. The secondary OH group may be optionally caped using a diisocyanate as is disclosed in commonly owned U.S. Pat. No. 5,641,834, incorporated herein by reference.

Specific examples of adducted hydroxy-terminated polybutadiene include the reaction of anhydride modified OH-terminal PBD with an epoxy, such as glycidyl substituents.

A preferred toughener system utilizes a combination of two polymers having differing molecular weights, as is taught in U.S. Pat. No. 6,225,408. A specific example taught therein is combination of a major amount of a primary toughener with a weight average molecular weight ($M_w$) less than about 18,000 together with a minor amount of an auxiliary toughener with a $M_w$ greater than about 18,000. A specific example is a 60:40 mixture of glycidal methacrylate terminated CTBN rubber, and a terblock copolymer of styrene-[isoprene]-styrene, at 25-[75]-25 parts by weight Adhesion Promoter Adhesion promoters useful herein are the known phosphorus-containing compounds with mono-esters of phosphinic, mono-and diesters of phosphonic and phosphoric acids having one unit of vinyl or allylic unsaturation present. Vinylic unsaturation is preferred. Representative of the phosphorus-containing adhesion promoters are, without limitation, phosphoric acid; 2-methacryloyloxyethyl phosphate; bis-(2-methacryloxyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; α-hydroxybutene-2 phosphonic acid; 1-hydroxy-1-phenyl-methane-1,1-diphosphonic acid; 1-hydroxy-1-methyl-1-disphosphonic acid: 1-amino-1-phenyl-1,1-diphosphonic acid; 3-amino-1-hydroxypropane-1,1-disphosphonic acid; aminotris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl)phosphinic acid and allyl methacryloyloxyethyl phosphinic acid. A preferred adhesion promoter is 2-hydroxyethylmethacrylate phosphate.

The above reactive phosphorus-containing compounds are illustrated by the formula:

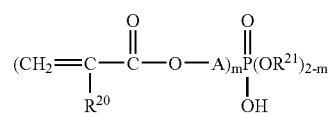

wherein $R^{20}$ is selected from the group consisting of hydrogen, an alkyl group having from one to 8, preferably one to 4, carbon atoms, and $CH_2CH$—; $R^{21}$ is selected from the group consisting of hydrogen, an alkyl group having from one to 8, preferably one to 4 carbon atoms; A is selected from the group consisting of —$R^{22}O$— and $R^{23}O)_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Initiator System

The initiator system includes at least one oxidizing agent in the B-side and at least one reducing agent in the A-side. This system is co-reactive at ambient conditions on mixture of Parts A and B to initiate addition polymerization reactions and cure the adhesive. Substantially any of the known oxidizing and reducing agents which are co-reactive at ambient conditions in air, can be employed.

Reducing agent is in the A-side at a typical suggested level of from 0.01 to 10, preferably 0.5 to 5, percent by weight, based on the total weight of A-side components. Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), diethanol-p-toluidine, dimethyl aniline, p-halogenated aniline derivatives and dimethyl-p-toluidine; and aminealdehyde condensation products, for example, the condensation products of aliphatic aldehydes such as butyraldehyde with primary amines such as aniline or butylamine.

The reducing agents are preferably tertiary amines. Representative preferred reducing agents are illustrated by the structure

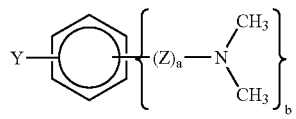

wherein Z is methylene; Y is selected from the group consisting of hydrogen, hydroxy, amino, halogen, alkyl having 1 to 8, preferably 1 to 4, carbon atoms, and alkoxy having 1 to 8, preferably 1 to 4, carbon atoms; a is 0 or 1; and b is 1 or 2. Examples include N,N-dimethyl aniline and N,N-dimethylaminomethylphenol.

According to a preferred embodiment of the invention, the A-side contains a parahalogenated tertiary amine reducing agent having the formula:

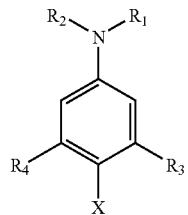

wherein each of $R_1$ and $R_2$, which may be the same or different, is independently selected from the group consisting of linear or branched, saturated or unsaturated, C1–C10 alkyl and linear or branched, saturated or unsaturated, $C_1$–$C_{10}$ hydroxyalkyl (i.e., alkyl substituted by —OH); each of $R_3$ and $R_4$ is independently selected from the group consisting of hydrogen and linear or branched, saturated or unsaturated $C_1$–$C_{10}$ alkyl; and X is halogen, preferably chlorine.

Representative bonding activators are oxidizing agents including, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride. Preferably, the oxidizing agent will be present in an amount in the range from about 0.5 to about 50 percent by weight of bonding accelerator, with the amount of reducing agent being in the range from about 0.05 to about 10 preferably about 0.1 to about 6, percent by weight of polymerizable adhesive composition. DIIPT is a preferred reducing agent. The most preferred oxidizing agent is benzoyl peroxide.

The bonding activator is present at from about 0.5 to about 50 percent by weight based on total weight of B-side and from about 30 to about 99.5 percent by weight, based on total weight of B-side can include a carrier vehicle.

The carrier vehicles which are suitable for use in the bonding activators can be a simple inert solvent or diluent such as methylene chloride, or butyl benzyl phthalate, including mixtures of such solvents or diluents. The carrier vehicle should contain no more than 5% by weight of any moiety which is reactive with the oxidizing agent at room temperature. The carrier vehicle can be a more complex mixture including at least one film-forming binder in addition to inert solvent or diluent. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

Epoxy Resin

The epoxy compound of the present invention can be any material that contains an epoxy (oxirane) group. Included epoxy resins are epoxy cresol novolacs, epoxy phenol novolacs and blends of either of these with bisphenol A epoxy resins. Monomeric epoxy compounds and epoxides of the polymeric type and can be aliphatic, cycloaliphatic, aromatic or heterocyclic. The "average" number of epoxy groups per molecule is determined by dividing the total number of epoxy groups in the epoxy-containing material by the total number of epoxy molecules present. Useful epoxy materials generally contain on the average at least 1.5 polymerizable epoxy groups per molecule. Preferably two or more epoxy groups per molecule are present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule.

The epoxy-containing materials may vary from low molecular weight monomeric materials to high molecular weight polymers and may vary greatly in the nature of their backbone and substituents groups. For example, the backbone may be of any type and substituents groups thereon being free of an active hydrogen atom. Illustrative of permissible substituents groups include halogens, ester groups, ethers, sulfonate groups, siloxane groups, nitro groups, phosphate groups, etc. The molecular weight of the epoxy-containing materials may vary from about 50 to 100,000 or more. Mixtures of various epoxy-containing materials can also be used in the compositions of this invention.

The epoxy compounds of the present invention can be cycloaliphatic epoxides. Examples of cycloaliphatic epoxides include diepoxides of cycloaliphatic esters of dicarboxylic acids such as bis(3,4-epoxycyclohexylmethyl)

oxalate, bis(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

Epoxy resins based on bisphenol A, either solids, per se, and capable of dissolution in a carrier, or liquids per se, are preferred as these are relatively inexpensive. There are a myriad of available epoxy materials, collectively referred to as epoxy resins whether resinous or simple compounds. In particular, simple epoxy compounds which are readily available include octadecylene oxide, glycidylmethacrylate, diglycidyl ether of bisphenol A (e.g., those available under the trade designations EPON from Shell Chemical Co., DER, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexylmethyl-3,4-epoxy-6-methylcyclohexene carboxylate (e.g., ERL-4201 from Union Carbide Corp.), bis(3,4-epoxy-6-methylcyclohexylmethyl) adipate (e.g. ERL-4289 from Union Carbide Corp.), bis(2,3-epoxycyclopentyl) ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether.

Still other epoxy-containing materials are copolymers of epoxy (meth)acrylic acid esters, such as glycidylacrylate and glycidylmethacrylate with one or more copolymerizable vinyl compounds. Examples of such copolymers are 1:1 styrene-glycidylmethacrylate, 1:1 methylmethacrylateglycidylacrylate and a 62.5:24:13.5 methylmethacrylate-ethyl acrylateglycidylmethacrylate.

Optional Additives

The A-side can also include up to about 60, preferably not more than about 30, percent by weight based on the total weight of the composition of a polymeric component having an intrinsic viscosity of 0.1 to 1.3. These can be obtained by the polymerization of at least one acrylic, styrene, substituted acrylic and non-acrylic olefinic monomers. Exemplary polymeric materials include poly(methyl methacrylate/n-butylacrylate/ethyl acrylate) (90/5/5); poly (n-butyl methacrylate/isobutyl methacrylate) (50/50); poly(n-butyl methacrylate), poly(ethyl methacrylate), and poly(tetrahydrofurfurylmethacrylate).

The adhesives can optionally contain 0.005 up to 5 weight percent, preferably 0.05 up to 2 weight percent, based on the total weight of the two parts of a cure rate moderator which is a vinyl aromatic compound, as disclosed in U.S. Pat. No. 5,869,160, incorporated herein by reference. The vinyl aromatic rate moderator excludes a polymer or an oligomer and comprises a vinyl functional group bonded to at least one aryl ring. The compound can be substituted in the sense that another functional group can be bonded to the vinyl-functional group or the aryl ring. Preferably, the vinyl aromatic compound has a structure represented by the following formula:

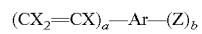

$(CX_2=CX)_a—Ar—(Z)_b$ wherein each X is the same or different and is hydrogen, alkyl, aryl or halogen; Ar is at least one aryl ring; and Z is a substituents on any position of the aryl ring(s) and is alkyl, alkoxy, aryl, aryloxy, halogen, haloalkyl, haloaryl, alkylaryl, arylalkyl, alkanoyl, and oxyalkanoyl; a is 1 or 2; and b is 0 to 9, preferably 1 to 9. X preferably is hydrogen or methyl. Ar preferably is only one aryl ring, but may be up to three rings. Ar also can be an aryl ring that include a heteroatom such as nitrogen, oxygen or sulfur. Z preferably is an alkyl group such as methyl, ethyl or tert-butyl, a halogen such as chlorine or bromine, a haloalkyl such as chloromethyl, or an oxyalkanoyl such as acetoxy. A substituted vinyl aromatic compound (i.e., X is a group other than hydrogen and/or b is at least 1) is preferred. If the substituents groups X or Z contain carbon, the number of carbon atoms can be limited to a reasonable amount (such as 10) to prevent steric hindrance, reactivity or synthesis problems.

Illustrative vinyl aromatic compounds include α-methylstyrene, 3-methylstyrene, 4-methylstyrene (i.e., vinyl toluene), 4-tert-butylstyrene, 4-methoxystyrene, 9-vinylanthracene, 2-bromostyrene, 3-bromostyrene, 4-bromostyrene, 4-acetoxystyrene, 4-benzyloxy-3-methoxystyrene, 4-chloromethylstyrene, 4-vinylpyridine, 1,1-diphenylethylene, styrene, α-methyl-p-methyl styrene, 2-vinyl pyridine and divinyl benzene. Especially preferred are α-methylstyrene and 4-methylstyrene.

Other optional additives which are typically considered in fully formulated adhesives include antioxidants, inhibitors, anti-sag additives, thixotropes, processing aids, waxes, UV stabilizers, arc suppressants, and drip suppressants. Examples of typical additives are fumed silica, alumina, hindered phenols, substituted hydroquinone, silane-treated talc, mica, feldspar, and wollastonite.

Forms and Uses

Although the adhesive of the present invention may take many forms, the most preferred adhesive systems are provided as multipack or two-part adhesive systems where one package or part contains the polymerizable or reactive components and the reducing agent and a second package or part contains the oxidizing agent. The two parts are mixed together at the time of use in order to initiate the reactive cure. The preferred means for dispensing the adhesive are two-chambered cartridges equipped with static mixers in the nozzle, and for larger scale application, meter mix dispensing equipment. After mixing the individual packages, one or both surfaces to be joined are coated with the mixed adhesive system and the surfaces are placed in contact with each other.

The adhesive systems of the invention may be used to bond metal surfaces, such as steel, aluminum and copper, to a variety of substrates, including metal, plastics, and other polymers, reinforced plastics, fibers, glass, ceramics, wood and the like. The adhesives are particularly useful in hem flange bonding of auto body panels. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing.

Although the adhesives of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel including hot dipped, electrogalvanized steel and galvanealed steel.

The adhesive coatings may be brushed, rolled, sprayed, dotted, knifed, cartridge-applied, especially from a dual cartridge; or otherwise applied to one substrate, but preferably to both substrates to desired thickness preferably not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding. The two metal surfaces and the interposed adhesive composition are maintained in engagement until the said adhesive composition has cured sufficiently to bond the said surfaces. Incorporation of glass beads to control bondline thickness is preferred especially in hemming operations, as is taught in U.S. Pat. Nos. 5,487,803 and 5,470,416.

EXAMPLES

The following examples are provided for illustration purposes only and are not intended to limit the scope of the invention in any manner.

Example 1

Epoxy Mix-Ratio

Araldite™ GY-6010 epoxy resin was added to the B-side of an acrylic structural adhesive at from 0 to 18 weight percent on total weight in 3 percent increments. The adhesive was cured using 2 weight percent of benzoyl peroxide (50% in a carrier) in the B-side. The results are presented in Table 1. The A- and B-side were hand-mixed using a split tongue blade. Example 1-A TMCH-MA, THF-MA and Isodecyl-MA containing adhesives were made. Various B-sides were used to deliver 10:1 and 4:1 mix ratios. These results are presented in Table 1. All adhesives were applied to dry lab towel wiped electrogalvanized substrate and tested for lap shear, hot strength, and T-peel performance under standard procedures.

TABLE 1

| Example | 1-A | 1-B | 1-C | 1-D | 1-E | 1-F | 1-G | 1-H (control) |
|---|---|---|---|---|---|---|---|---|
| Epoxy (wt. % of total) | 18% | 15% | 12% | 9% | 6% | 3% | 0% | 0% |
| Lapshears (PSI) | 1926 | 1843 | 2053 | 2019 | 2122 | 2160 | 2005 | 2109 |
| T-Peel (PLI) | 39 | 40 | 40 | 41 | 48 | 51 | 44 | 41 |
| Hot Strength (PSI) | 142 | 167 | 182 | 179 | 198 | 172 | 182 | 218 |

All samples were averages of 6 and the samples were postbaked for 30 minutes at 150° C. except for the hot strength samples, which were not postbaked. The results indicate that the best epoxy resin levels were between 3 and 6 weight percent.

| A-side | WT. % |
|---|---|
| Methacrylate ester* | 3.723 |
| Diethanol-para-toluidine | 1.300 |
| HEMA-Phosphate | 3.110 |
| Ehtoxylated Epoxy-dimethacrylate | 3.500 |
| HEMA-phthalate | 2.210 |
| Primary toughener | 38.112 |
| Auxiliary toughener | 25.218 |
| Cure rate moderator | 0.070 |
| Inhibitor | 0.004 |
| Hindered tri substituted phenol | 0.003 |
| Wollastonite | 12.140 |
| Fumed silica | 3.000 |
| Glass beads (0.25 mm diameter) | 7.600 |
| Tinting dye | 0.005 |
| Total | 100.00 |

*2A: THF-methacrylate (control)
2-B: THF-methacrylate (control)
2-C: 3,3,5-trimethylcyclohexyl methacrylate
2-D: 3,3,5-trimethylcyclohexyl methacrylate

| B-Side | |
|---|---|
| Components | Dry Weight % |
| GY 6010 Epoxy Resin | 60.00 |
| Benzoyl peroxide | 12.00 |
| Calcium carbonate | 15.00 |
| Fumed silica | 1.00 |
| | 100.00 |

Six samples were prepared for each test and the glue was applied to dry lab towel wiped Electrogalvanized substrate using 50 cc cartridges equipped with static mixers. T-Peel samples were allowed to cure overnight at room temperature, and then post baked for 30 minutes at 150° C. Lapshear and hot strength samples were not postbaked. An Instron® test method was performed using a crosshead speed of 2 inches per minute for all of the test series. Hot Strength is measured at 190° C. in an Instron Environmental chamber.

| Example | 2-A | 2-B | 2-C | 2-D |
|---|---|---|---|---|
| Mix ratio | 4:1 | 10:1 | 4:1 | 10:1 |
| Lapshears (PSI) | 2043 | 2356 | 1842 | 2334 |
| T-Peel (PLI) | 42 | 48 | 46 | 70 |

Surprising improvements are noted in T-peel and Lapshear tests when the mix ratio is increased. Surprising improvements in T-peel and lap shear were also observed in the embodiments utilizing the preferred methacrylate esters which exhibit homopolymer Tg's above 105° C.

What is claimed is:

1. A two-part acrylic structural adhesive exhibiting improved T-peel strength on metal surfaces and cures at ambient conditions, comprising:
   in a first package from about 10 to about 90 percent by weight of at least one ethylenic unsaturated methacrylic ester comprising
   a $C_1$–$C_6$ alkyl disubstituted, a $C_1$–$C_4$ alkyl tri-substituted, or a $C_1$–$C_4$ alkyl tetra-substituted cyclohexyl methacrylate, or combinations thereof,
   from about 10 to about 80 percent by weight of a toughener,
   an adhesion promotor; and
   in a second package, a bonding activator.

2. The adhesive of claim 1, wherein said ethylenic unsaturated methacrylic ester comprises 3,3,5-trimethylcyclohexyl methacrylate, 4-tert-butylcyclohexyl methacrylate, 3,3,5,5-tetramethylcyclohexyl methacrylate, or 3,4,5-trimethylcyclohexyl methacrylate, or combinations thereof.

3. The adhesive composition of claim 1, wherein the weight ratio of the first package to the second package is from about 4:1 to about 10:1.

* * * * *